(12) United States Patent
Van Limpt et al.

(10) Patent No.: US 8,968,544 B2
(45) Date of Patent: Mar. 3, 2015

(54) APPARATUS AND METHOD FOR REMOVAL OF IONS

(75) Inventors: Bart Van Limpt, Leiden (NL); Hank Robert Reinhoudt, Delft (NL); Albert Van Der Wal, Oegstgeest (NL)

(73) Assignee: Voltea B.V., Sassenheim (NL)

( * ) Notice: Subject to any disclaimer, the term of this patent is extended or adjusted under 35 U.S.C. 154(b) by 299 days.

(21) Appl. No.: 13/641,608

(22) PCT Filed: Apr. 28, 2011

(86) PCT No.: PCT/EP2011/056782
§ 371 (c)(1),
(2), (4) Date: Nov. 30, 2012

(87) PCT Pub. No.: WO2011/135048
PCT Pub. Date: Nov. 3, 2011

(65) Prior Publication Data
US 2013/0092542 A1    Apr. 18, 2013

(30) Foreign Application Priority Data
Apr. 29, 2010  (EP) .................................... 10161497

(51) Int. Cl.
*G01N 27/447* (2006.01)
*G01N 27/453* (2006.01)
*C02F 1/469* (2006.01)
*B01D 57/02* (2006.01)
(Continued)

(52) U.S. Cl.
CPC .............. *C02F 1/4691* (2013.01); *B01D 57/02* (2013.01); *B01D 61/44* (2013.01); *B01D 61/46* (2013.01); *B01D 61/50* (2013.01); *C02F 1/46109* (2013.01); *C02F 2201/002* (2013.01); *H01G 9/0029* (2013.01)
USPC ........................................................ 204/550

(58) Field of Classification Search
USPC ........................................................ 204/550
See application file for complete search history.

(56) References Cited

U.S. PATENT DOCUMENTS 3,585,122 A   6/1971  King .............................. 205/666
5,360,540 A   11/1994 Andelman .................. 210/198.2
(Continued)

FOREIGN PATENT DOCUMENTS

JP   2006-088004      4/2006
WO  WO 2009/062872   5/2009

OTHER PUBLICATIONS

JPO machine-generated English language translation of Fujihata JP 2006-88004 A, patent published Apr. 6, 2006.*
(Continued)

*Primary Examiner* — Alex Noguerola
(74) *Attorney, Agent, or Firm* — Pillsbury Winthrop Shaw Pittman LLP

(57) ABSTRACT

An apparatus to remove ions, the apparatus having a housing including an inlet to let water in an interior of the housing, an outlet to let water out of the interior of the housing, a first electrode having a current collector, a second electrode, and a spacer to separate the first and second electrodes and to allow water to flow between the first and second electrodes. The apparatus also has a connector to connect the first electrode, or the second electrode, or both first and second electrodes, with an electrical source. The connector may have two connector parts to clamp the current collector in between the connector parts, the connector constructed and arranged to avoid water-metal contact.

22 Claims, 3 Drawing Sheets

(51) Int. Cl.
  *B01D 61/44* (2006.01)
  *B01D 61/46* (2006.01)
  *B01D 61/50* (2006.01)
  *C02F 1/461* (2006.01)
  *H01G 9/00* (2006.01)

(56) References Cited

U.S. PATENT DOCUMENTS

| | | | |
|---|---|---|---|
| 5,748,437 A | 5/1998 | Andelman | 205/748 |
| 6,096,179 A | 8/2000 | Fajt | 204/294 |
| 6,413,409 B1 | 7/2002 | Otowa | 205/708 |
| 2009/0218227 A1 | 9/2009 | Noh | 204/666 |

OTHER PUBLICATIONS

International Search Report and Written Opinion as issued for International Application No. PCT/EP2011/056782, dated Sep. 6, 2011.

Extended Search Report, including the Search Opinion, as issued for European Patent Application No. 10161497.2, dated Nov. 22, 2010.

* cited by examiner

APPARATUS AND METHOD FOR REMOVAL OF IONS

FIELD

The invention relates to an apparatus to remove ions.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water purification is by capacitive deionization, using an apparatus having a flow through capacitor (FTC) to remove ions in water. The FTC functions as an electrically regenerable cell for capacitive deionization. By charging electrodes, ions are removed from an electrolyte and are held in an electric double layer at the electrodes. The electrodes can be (partially) electrically regenerated to desorb such previously removed ions without adding chemicals.

The apparatus to remove ions comprises one or more pairs of spaced apart electrodes (a cathode and an anode) and a spacer separating the electrodes and allowing water to flow between the electrodes. The electrodes have current collectors or backing layers that are generally adjacent to or very near the electrodes and a material to store the ions. Current collectors are electrically conductive and transport charge in and out of the electrodes.

The apparatus comprises a housing comprising a water inlet to let water in the housing and a water outlet to let water out of the housing. In the housing of the apparatus, the layers of electrodes and spacers are stacked in a "sandwich" fashion by compressive force, normally by mechanical fastening.

A charge barrier may be placed adjacent to an electrode of a flow-through capacitor. The term charge barrier refers to a layer of material which is permeable or semi-permeable and is capable of holding an electric charge. Ions are retained or trapped, on the side of the charge barrier towards which the like-charged ions migrate. A charge barrier may allow an increase in ionic efficiency, which in turn allows energy efficient ion removal.

SUMMARY

A problem with the apparatus to remove ions is that the efficiency may be low and/or that the efficiency may deteriorate over time.

It is, for example, an object to provide an improved apparatus to remove ions.

According to an embodiment of the invention, there is provided an apparatus to remove ions, the apparatus comprising a housing, the apparatus comprising:
an inlet to let water into an interior of the housing;
an outlet to let water out of the interior of the housing;
a first electrode comprising a current collector;
a second electrode;
a spacer to separate the first and second electrodes and to allow water to flow in between the first and second electrodes; and
a connector to connect the current collector to an electrical source outside the housing and constructed and arranged to conduct electricity to and from the current collector, wherein the connector comprises metal, the current collector is clamped by the connector and the apparatus is constructed and arranged to avoid contact between the water and the metal of the connector.

According to an embodiment of the invention, there is provided a method to remove ions, the method comprising:
allowing water to enter a housing via an inlet;
allowing the water to flow in between a first electrode, comprising a current collector, in the housing and a second electrode in the housing to an outlet;
clamping the current collector by a connector comprising metal;
connecting the current collector inside the housing via the connector to an electrical source outside the housing; and
charging the first and second electrodes while avoiding contact of water with the metal.

These and other aspects, features and advantages will become apparent to those of ordinary skill in the art from reading the following detailed description and the appended claims. For the avoidance of doubt, any feature of one aspect of the present invention may be utilized in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple preferred ranges are described in the format "from x to y", it is understood that all ranges combining the different endpoints are also contemplated.

BRIEF DESCRIPTION OF THE FIGURES

Embodiments of the invention will be described, by way of example only, with reference to the accompanying schematic drawings in which corresponding reference symbols indicate corresponding parts, and in which.

DETAILED DESCRIPTION

Figure 1:
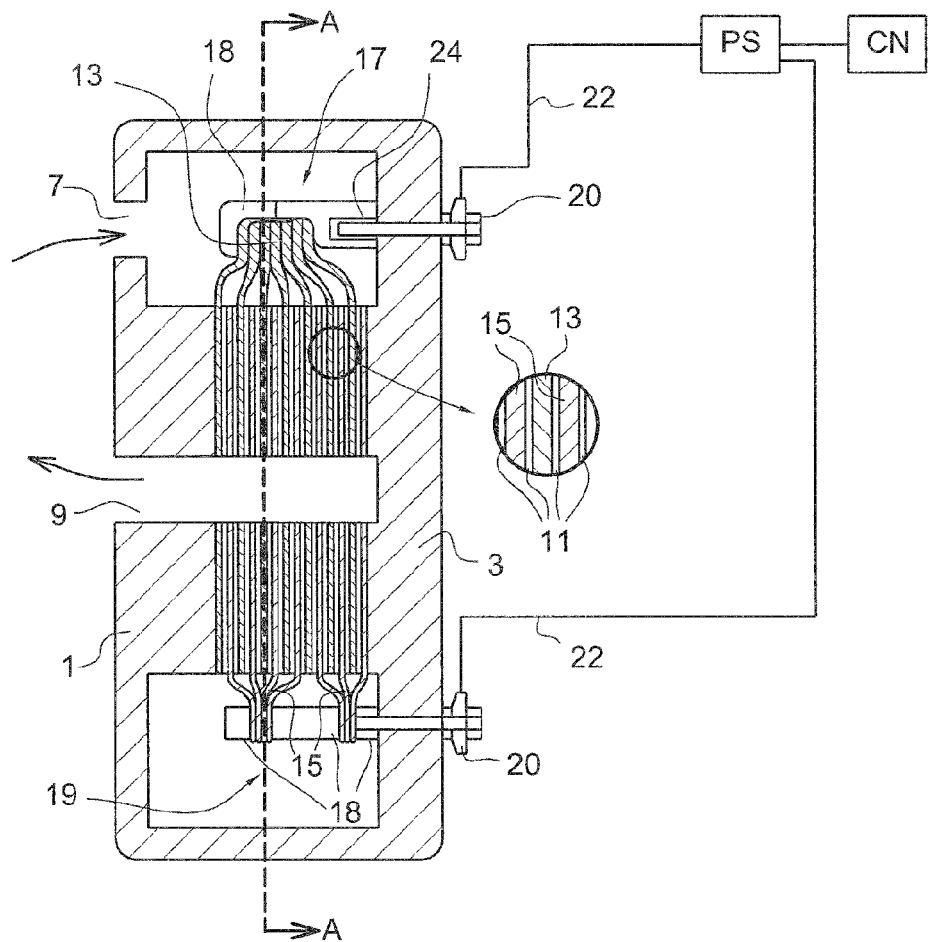
FIG. 1 shows a schematic cross-section of an apparatus to remove ions according to an embodiment of the invention.

FIG. 1 shows a schematic cross-section of an apparatus to remove ions according to an embodiment of the invention. The apparatus may have a housing comprising a first housing part 1 and a second housing part 3 made of a relatively hard material e.g. a hard plastic. By pressing the first and second housing parts on each other, for example with a bolt and nut (not shown), the housing is made water tight. Adhesive, a seal or an O-ring may be used to improve the water tightness of the housing.

The housing comprises a water inlet 7 and a water outlet 9. During ion removal from the water, the water will flow from the inlet 7 to the outlet 9 through the spacers 11 which separates the first electrode and the second electrode from each other. The electrodes are clamped within the housing to provide a water leakage free apparatus. By creating an electrical potential difference between the first and second electrodes, for example by applying a positive voltage to the current collector of the first electrode (the anode) 13 and a negative voltage to the current collector of the second electrode (cathode) 15, the anions of the water flowing through the spacer 11 are attracted to the first electrode and the cations are attracted to the second electrode. In this way the ions (anions and cations) will be removed from the water flowing through the spacer 11. If the electrodes are saturated with ions the electrodes may be regenerated by releasing the potential difference and electrically discharging the electrodes. This way the ions will be released from the electrodes into the water flowing through the spacer. This will result in an increase in the ion content in the water in the spacer and this water will be flushed out of the spacer. Once most ions are released from the electrodes and the water with increased ion content is flushed out of the spacer, the electrodes are regenerated and can be used again for attracting ions.

The electrical potential difference between the anode and the cathode is rather low, for example lower than 2 Volts, lower than 1.7 Volts or lower than 1.4 Volts. The electrical resistance of the electrical circuit should be sufficiently low. For this purpose, the current collectors 13 of the first electrode are bundled together with the first connector 17 and the current collectors 15 of the second electrode are bundled together with the second connector 19.

According to an embodiment of the invention the first connector 17 comprises at least two connector portions 18, e.g. clamps, to clamp the first electrode portions 13 between the clamps 18. The clamps 18 may be made from carbon, for example graphite blocks. The clamps 18 may have a recess so as to better clamp the current collectors 13 of the first electrode and to optimize the contact surface between the current collector 13 of the first electrodes and the clamps 18. To make the first connector 17 two clamps 18 may be pressed against multiple current collectors of the first electrode 13 so as to press the current collectors 13 together and subsequently an adhesive may be used to permanently fix the clamps 18 with the current collectors 13 in a watertight manner. Alternatively or additionally, a nut and bolt may be used to press the current collectors 13 together with the clamps so as to avoid water/metal contact of the connector. For a low electrical resistance it is advantageous to make the contact surface of the current collector and the connector of the same material, for example carbon. An advantage of carbon is that it does not corrode in the water and that it is relatively cheap compared to non-corrosive metals. The pressure to clamp the current collector 13, 15 to the connector 17, 19 may be at least 0.1 bar or at least 0.5 bar and less than 15 bar, less than 10 bar or less than 5 bar. The first connector 17 may include a metal insert 24 which provides a good electrical connection between the carbon and the insert. The first connector 17 may include a screw 20 to provide contact with the insert 24 through a feed through in the housing. The first connector 17 may be glued against the housing so as to avoid contact of the water in the housing with the metal insert 24 or the screw 20 which may also be made out of metal. In this way corrosion of the metal insert and the screw may be prevented. If both the insert 24 and the screw 20 are made from metal, good electrical contact between the two is assured.

The second connector 19 may comprise three connector portions 18, e.g. clamps, according to a further embodiment of the invention. The clamps 18 may be box shaped and may be used to clamp the current collectors 15 of the second electrodes therebetween. The clamps 18 may be made from carbon, for example graphite. To make the second connector 19, three clamps 18 may be pressed against multiple current collectors 15 so as to press the collectors 15 together and subsequently an adhesive may be used to permanently fix the clamps 18 with the current collectors 15 in, optionally, a watertight manner. Alternatively or additionally, the second connector 19 may include the clamps having a recess as described with respect to the first connector 17. The box shaped clamps of the second connector 19 may be used as an alternative to the clamps with a recess of the first connector 17.

The second connector 19 may be positioned against the housing 1, 3. The second connector 19 may be connected to an electrical power source. A water tight connection may be provided between the housing and the second connector 19 at a position where the connector 19 is positioned against the housing. A feed through is provided through the housing 1, 3 at a position where the second connector is positioned against the housing 1, 3. The feed through may include a metal screw 20 on which the cable 22 connecting to the electrical power source PS may be connected. The source PS may be controlled by a controller CN to control the operation of the apparatus.

The electrodes may be made substantially metal free to keep them corrosion free in the wet interior of the housing and at the same time cheap enough for mass production. The electrodes may be produced from a current collector 13, 15 having a substantially metal free electrically conductive high surface area layer, or self-supporting film, which may contain activated carbon, carbon nanotubes or a carbon aerogel on both sides which are in contact with the water. The electrode comprises a material to store ions, for example a high surface area layer which is a layer with a high surface area in square meters per weight of layer material e.g. >500 $m^2/gr$.

Figure 2:
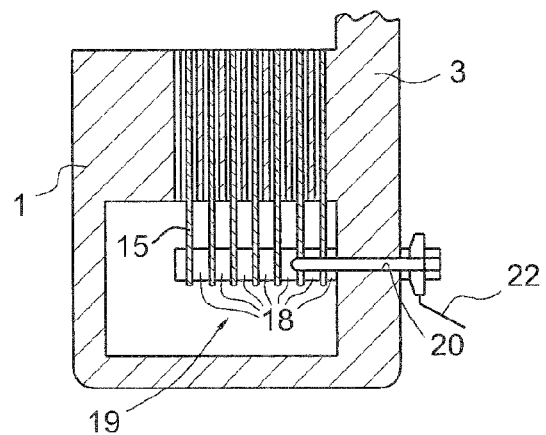
FIG. 2 shows a schematic cross-section of an apparatus to remove ions according to a further embodiment of the invention.

FIG. 2 depicts a second connector 19 according to a further embodiment of the invention. The connector 19 includes multiple clamps 18 which are used to clamp multiple current collectors 15 of the second electrode individually together. The connector 19 may be produced by pressing the current collectors 15 of the second electrode and the clamps 18 together and providing an adhesive around it to make a permanent connection, which optionally may be watertight to avoid water metal contact. The connector 19 may also be mounted against the housing 1, 3 with adhesive. A feed through for example a metal screw 20 may be provided through the housing 1, 3 into one or more of the clamps and multiple current collectors 15 of the second electrode so as to connect the electrode with a power source via the cable 22.

Figure 3:
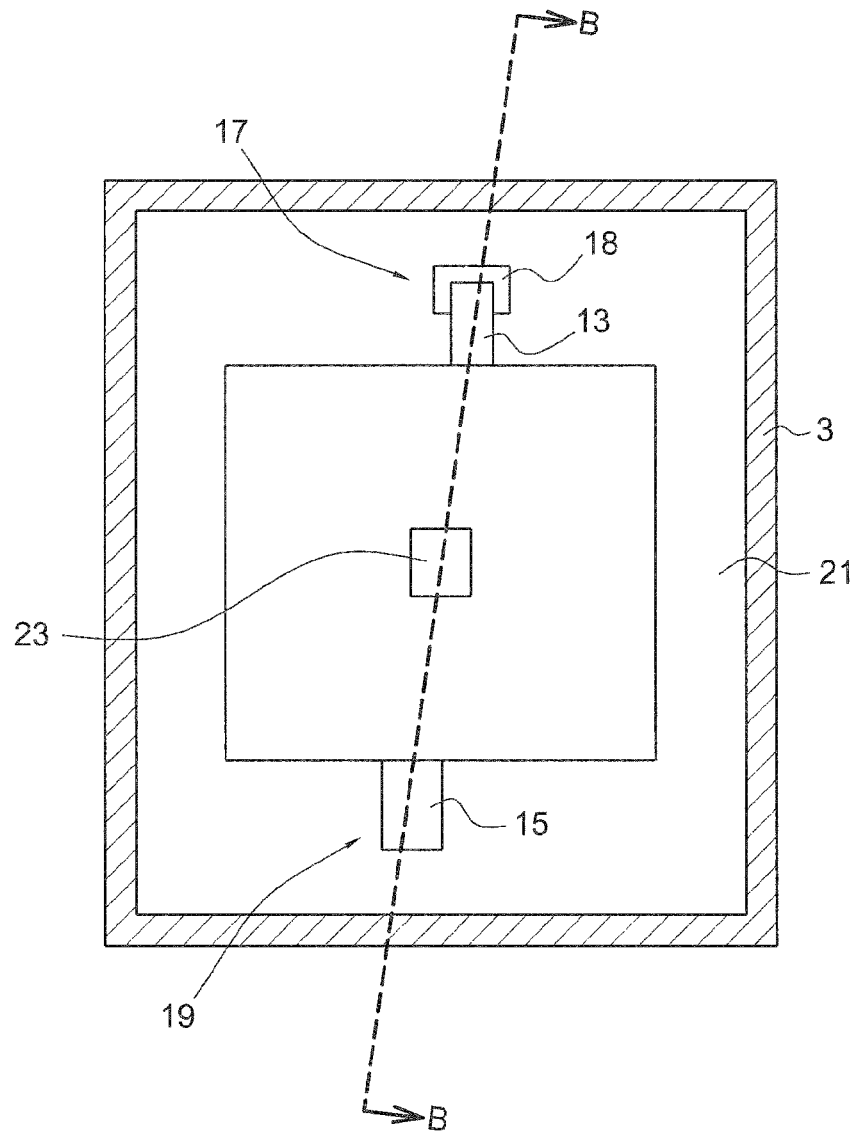
FIG. 3 discloses a cross section along the line A-A of the apparatus of FIG. 1.

FIG. 3 discloses a cross-section along line A-A of the apparatus of FIG. 1. It shows the second electrode 15 with the second connector 19. The housing 1, 3 has a space 21 to allow water to flow around the electrodes and the spacers 11 and a second passage 23 to allow water to collect from all the spacers 11 and flow through the outlet 9 (of FIG. 1). The connector 17 to connect the first electrode portions 13 is also shown. FIG. 1 is a cross section along the line B-B of FIG. 3.

Figure 4:
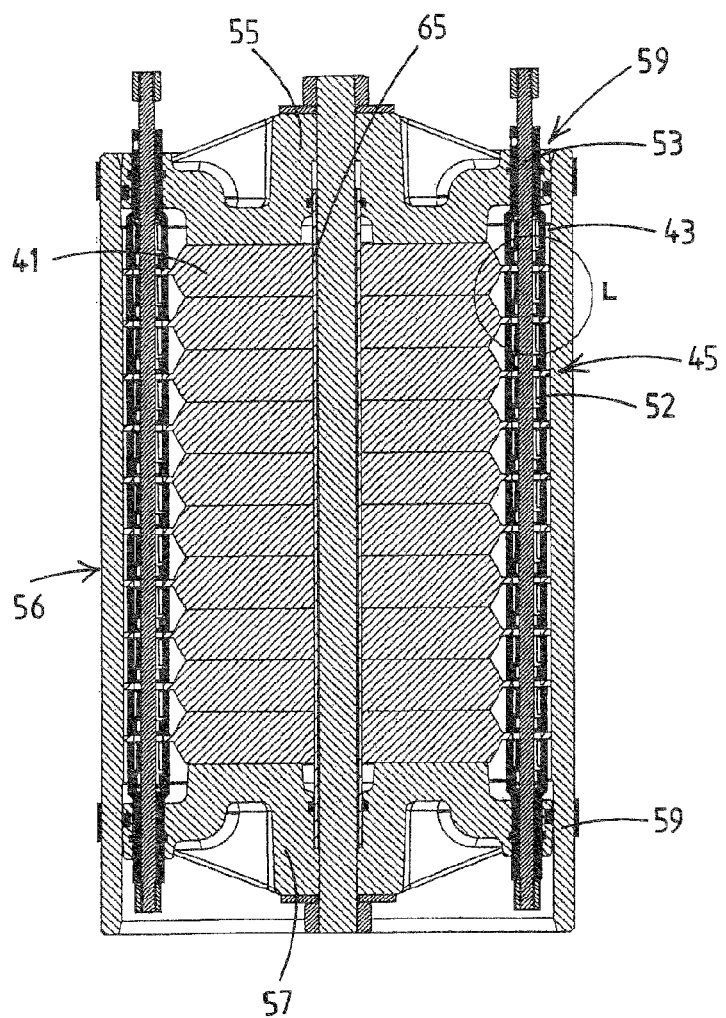
FIG. 4 shows a schematic cross-section of an apparatus to remove ions according to a further embodiment of the invention.
Figure 4:
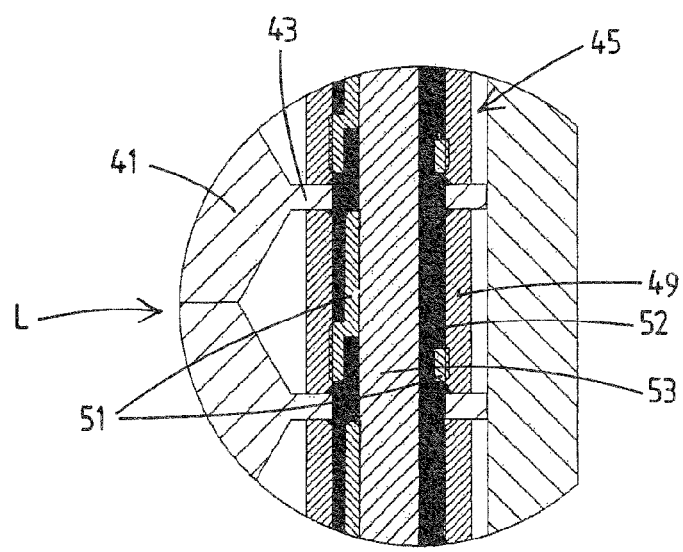

FIG. 4 shows a schematic cross-section of an apparatus to remove ions according to a further embodiment of the invention with a part of the housing removed. The apparatus is build up out of 10 flow through capacitor stacks 41. The flow through capacitor stack may have repeating units of a first electrode, a spacer and a second electrode. The first current collectors 43 of the first electrode are bundled and/or clamped together with a connector 45. The second current collectors of the second electrode may be equally bundled/clamped together. The connector 45 comprises connector parts 49 comprising carbon e.g. graphite to clamp the current collectors together. The pressure to clamp the current collector 43 to the connector 45 may be at least 0.1 bar or at least 0.5 bar and less than 15 bar, less than 10 bar or less than 5 bar. This range is advantageous because it helps assure good electrical conductivity while not damaging the connector parts. The current collectors 43 and the connector parts 49 may both be made of the same material e.g. carbon to lower the electrical resistivity between the current collector 43 and the connector 45. The connector part may comprise metal e.g. copper inserts 51. The inserts 51 are prefabricated inside the connector parts 49 so as to help assure low electrical resistivity between the metal insert 51 and the connector part 49. The connector 45 may comprise a metal rod 53 made of, for example copper, to electrically connect all the connector parts 49 via their metal inserts 51 to a power source (not shown). The metal inserts 51 and the metal rod 53 will be shielded from the water inside the apparatus by resin 52 which is applied to the connector 45. The metal e.g. copper rod and/or the metal insert, may improve the conductivity of the connector 45. As an alternative to resin, petroleum jelly, paraffin or wax may be provided to the connector 45 so as to avoid water/metal contact. An advantage of petroleum jelly, paraffin or wax may be that it may be applied in liquid form at a high temperature whereby it solidifies after cooling. Whenever the apparatus needs to be opened for repair or investigation, the petroleum jelly, paraffin or wax may be melted away.

The apparatus includes a housing 56 comprising top and bottom parts 55, 57. The top and/or bottom part 55, 57 of the housing includes a feed-through 59 to allow the connector 45 to make a connection with the power source outside the housing 56. A plastic insert may be provided in the housing to make it water tight.

Water may be provided to an interior of the apparatus via a water inlet. The water is allowed to flow around the flow through capacitor stacks 41 and may enter the stacks via the spacers. The flow through capacitor stack 41 has a square hole in the middle of the stack. In the square hole a circular tube 65 is provided, via the space between the square hole and the tube the water will flow to an outlet. The interior of the tube 65 may comprise a nut and bolt so as to clamp the capacitor stacks 41 between the upper and bottom part 57, 55 of the housing.

The efficiency of the apparatus may be guaranteed for a relatively long period since the water in the interior of the housing is not in contact with the metal insert 51 and rod 53 and therefore corrosion will not deteriorate the operation of the apparatus.

Electrode

The electrodes (anode and/or the cathode) may be made metal free by making them from a carbonaceous material, for example activated carbon, which may be bound together in a polytetrafluoroethylene (Teflon™) matrix or carbon aerogel. The electrodes, which may be used in FTC cells, may be treated with a concentrated salt solution to promote the ion removal capacity of the electrodes as well as ion conductivity and hence speed of removal.

The material to store the ions may comprise a high surface area layer e.g. a porous carbon layer, which can be a flexible layer, or a non-flexible layer.

The carbon used in the electrode layer may comprise activated carbon, and optionally any other carbonaceous material, such as carbon black, a carbon aero-gel, carbon nanofibers, graphene or carbon nanotubes. The carbon may be chemically activated carbon or may be steam activated carbon. The carbon may have a high surface area of at least 500 $m^2/g$, at least 1000 $m^2/g$, or at least 1500 $m^2/g$. The anode and cathode may be made out of different carbonaceous materials. Well known non-flexible carbon layers are made from carbon aerogel. The aerogel is often manufactured as a composite paper: non-woven paper made of carbon fiber, impregnated with resorcinol-formaldehyde aerogel, and pyrolyzed. Depending on the density, the carbon aerogel may be electrically conductive, making composite aerogel paper useful for electrodes in capacitors or deionization electrodes.

The carbon may be present in the electrode in a concentration of at least 60%, at least 70%, at least 80%, or at least 85% by weight of the dry electrode. The use of a thermoplastic or viscoelastic material such as latex or a curable resin to form a monolith from powdered material is common. Examples of carbon layers that use polytetrafluoroethylene (PTFE) as binder material are the PACMM™ series (from Material Methods).

One embodiment of the invention comprises an active carbon fiber woven layer or carbon cloth, e.g. the Zorflex® range (from Chemviron Carbon).

An embodiment of the invention comprises a carbon coating comprising: polyelectrolyte; binder; and carbon, which can be coated directly onto the current collector with a method described in PCT patent application publication number WO/2009/062872, incorporated herein by reference in its entirety.

The electrode may comprise a current collector. The current collector may be made from an electrically conducting material. Suitable metal free materials are, e.g., carbon, such as graphite, graphene, a graphite sheet or a carbon mixture with high graphite content. It is advantageous to use a metal free electrode because metals are expensive and introduce a risk of corrosion. The current collector is generally in the form of a sheet. Such a sheet is herein defined to be suitable to transport at least 33 Amps/$m^2$ and up to 2000 Amps/$m^2$. The thickness of a graphite current collector then typically becomes from 100 to 1000 micrometers, generally 200 to 500 micrometers.

Spacer

The spacer material may comprise an inert type material, such as an open space synthetic material and can be any material made from a polymer, plastic or fiberglass. The spacer can be a porous or non-porous, woven or non-woven material. The spacer may be prepared from a material that is electrically insulating, but allows ion conductance. Suitable spacers are, for example, the Nitex® range or Petex® range (from Sefar), which are open mesh fabrics or filter fabrics, made from polyamide or polyethylene terephthalate.

Charge Barrier Layer

The flow through capacitor may comprise a charge barrier. The charge barrier comprises a membrane, selective for anions or cations, or certain specific anions or cations and which may be placed between the electrode and the spacer. The charge barrier may be applied to the high surface area electrode layer as a coating layer or as a laminate layer.

Suitable membrane materials may be homogeneous or heterogeneous. Suitable membrane materials comprise anion exchange and/or cation exchange membrane materials, such as ion exchange materials comprising strongly dissociating anionic groups and/or strongly dissociating cationic groups. Examples of such membrane materials are the Neosepta™ range of materials (from Tokuyama), the range of PC-SA™ and PC-SK™ material (from PCA GmbH), ion exchange membrane materials from, e.g., Fumatec, Ralex™ (from Mega) ion exchange membrane materials or the Excellion™ range of heterogeneous membrane material (from Snowpure).

Stack

A FTC may comprise at least one repeating unit of:
anionic current collector/electrode
optionally an anion exchange membrane as charge barrier
a conventional FTC spacer
optionally a cation exchange membrane as charge barrier
cathode current collector/electrode.

Typically the number of repeating units in a FTC stack, as found in practice, is limited by the number of electrode layers than can be practically bundled and connected to the connector. It is desirable that the number of repeating units in a FTC is at least 1, at least 5, at least 10, or at least 20. For practical reasons, the number of repeating units is generally not more than 200, not more than 150, not more than 100, or not more than 50.

The stack may be compressed at a pressure of less than 4 bar and optionally not more than 1.5 bar.

The stack may comprise one or more, so called, floating electrodes. A floating electrode is an electrode not directly connected to a power source but receiving its charge from one or more other electrodes in the stack which are connected to a power source. A floating electrode may be positioned parallel and in between the master electrodes in the stack. An embodiment of the invention may be used to connect the master electrodes in the stack to the power source. An advantage of using a floating electrode is that the voltages through the connector will be higher while the currents through the connector will be lower. Electrical resistivity in the connector may be lowered significantly by using one or more floating electrodes.

The electrodes can also be in the configuration of an FTC stack in spirally wound form.

While specific embodiments of the invention have been described above, it will be appreciated that the invention may be practiced otherwise than as described. For example, an embodiment of the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

The invention claimed is:

1. An apparatus to remove ions, the apparatus comprising:
a housing;
an inlet to let water in an interior of the housing;
an outlet to let water out of the interior of the housing;
a first electrode comprising a current collector;
a second electrode;
a spacer to separate the first and second electrodes and to allow water to flow in between the first and second electrodes; and
a connector to connect the current collector inside the housing to an electrical source outside the housing and constructed and arranged to conduct electricity to and from the current collector, wherein the connector comprises metal, the current collector is clamped by the connector and the apparatus is constructed and arranged to avoid contact between the water and the metal of the connector.

2. The apparatus according to claim 1, wherein the connector comprises at least two connector parts to clamp the current collector in between the at least two connector parts.

3. The apparatus according to claim 1, wherein the current collector and the connector comprise the same material.

4. The apparatus according to claim 1, wherein the connector comprises carbon.

5. The apparatus according to claim 1, wherein the connector comprises a metal insert.

6. The apparatus according to claim 1, wherein the connector is positioned against the housing and extends partially through the housing.

7. The apparatus according to claim 6, wherein a water tight connection is provided between the housing and the connector so as to shield a metal portion of the connector from the water.

8. The apparatus according to claim 7, wherein the housing has a feedthrough at a position where the connector is positioned against the housing.

9. The apparatus according to claim 8, wherein the metal of the connector is in the feedthrough.

10. The apparatus according to claim 9, wherein resin, petroleum jelly, paraffin or wax is provided to the connector so as to avoid water/metal contact.

11. The apparatus according to claim 9, comprising multiple current collectors and wherein the multiple current collectors are clamped together by the connector within the housing.

12. The apparatus according to claim 1, wherein a clamp pressure between the current collector and the connector is at least 0.1 bar.

13. The apparatus according to claim 1, further comprising the electrical source, the electrical source configured to provide an electrical potential of less than 2 Volts.

14. The apparatus according to claim 1, further comprising a floating electrode between the first and the second electrodes.

15. A method to remove ions, the method comprising:
allowing water to enter a housing via an inlet;
allowing the water to flow in between a first electrode, comprising a current collector, in the housing and a second electrode in the housing to an outlet, wherein the current collector is clamped by a connector comprising metal and the current collector inside the housing is connected via the connector to an electrical source outside the housing;
and
charging the first and second electrodes while avoiding contact of water with the metal.

16. An apparatus to remove ions, the apparatus comprising:
a housing;
an inlet to let water in an interior of the housing;
an outlet to let water out of the interior of the housing;
a first electrode comprising a current collector;
a second electrode;
a spacer to separate the first and second electrodes and to allow water to flow in between the first and second electrodes; and
a connector to connect a plurality of current collectors inside the housing to an electrical source outside the housing, wherein the connector comprises metal, the connector clamps the current collectors together and the apparatus is constructed and arranged to avoid contact between the water and the metal of the connector.

17. The apparatus according to claim 16, wherein the connector comprises at least two connector parts to clamp the current collectors in between the at least two connector parts.

18. The apparatus according to claim 16, wherein the current collectors and the connector comprise the same material.

19. The apparatus according to claim 16, wherein the connector comprises a metal insert.

20. The apparatus according to claim 16, wherein the connector is positioned against the housing and extends partially through a feedthrough of the housing, wherein the metal of the connector is in the feedthrough.

21. The apparatus according to claim 16, wherein the connector comprises carbon.

22. A method of manufacturing a flow through capacitor having a housing comprising a first electrode comprising a current collector, a second electrode, a spacer to separate the first and second electrodes and to allow water to flow in between the first and second electrodes, and a connector to electrically connect the current collector inside the housing to an electrical source outside the housing, the method comprising:

clamping the current collector inside the housing by the connector, the connector comprising metal and constructed and arranged to avoid contact between the water and the metal of the connector.

\* \* \* \* \*